US006289587B1

(12) United States Patent
Battat et al.

(10) Patent No.: US 6,289,587 B1
(45) Date of Patent: Sep. 18, 2001

(54) METHOD TO RENEW A SPENT FUSER MEMBER

(75) Inventors: David Battat, Rochester; Santokh S. Badesha, Pittsford; Clifford O. Eddy, Webster; Louis D. Fratangelo, Fairport; Arnold W. Henry, Pittsford; Alan R. Kuntz, Webster, all of NY (US)

(73) Assignee: Xerox Corporation, Stamford, CT (US)

(*) Notice: Subject to any disclaimer, the term of this patent is extended or adjusted under 35 U.S.C. 154(b) by 92 days.

(21) Appl. No.: 08/873,958

(22) Filed: Jun. 12, 1997

(51) Int. Cl.[7] .................................................... B23P 15/00

(52) U.S. Cl. ...................................... 29/895.1; 29/402.06

(58) Field of Search ............................ 29/815.1, 402.06, 29/895.3, 895.33; 451/49

(56) References Cited

U.S. PATENT DOCUMENTS

| | | | | |
|---|---|---|---|---|
| 48,453 | * | 6/1865 | Sentell | 29/895.1 |
| 2,073,895 | * | 3/1937 | Kauffman | 29/895.1 |
| 3,604,239 | * | 9/1971 | Moxon | 451/49 |
| 4,465,646 | | 8/1984 | Evans et al. | 264/24 |
| 4,700,450 | * | 10/1987 | Michel | 29/527.2 |
| 4,876,777 | | 10/1989 | Chow | 29/132 |
| 4,951,422 | * | 8/1990 | Ibe et al. | 451/49 |
| 5,035,950 | | 7/1991 | Del Rosario | 428/421 |
| 5,367,769 | * | 11/1994 | Searcy et al. | 29/895.3 |
| 5,400,630 | * | 3/1995 | Okumura et al. | 29/895.1 |
| 5,595,823 | | 1/1997 | Chen et al. | 428/421 |
| 5,644,828 | * | 7/1997 | Sailer et al. | 29/895.1 |
| 5,649,362 | * | 7/1997 | Yamamoto et al. | 29/895.33 |
| 5,660,092 | * | 8/1997 | Scholz et al. | 82/1.11 |
| 5,765,286 | * | 6/1998 | Sato et al. | 29/895.1 |

* cited by examiner

*Primary Examiner*—I Cuda Rosenbaum
(74) *Attorney, Agent, or Firm*—Zosan S. Soong

(57) ABSTRACT

There is disclosed a method for reusing a fuser member containing an outer layer having an original fusing surface that is deficient including: removing a portion of the thickness of the outer layer including the original fusing surface to create on the remaining outer layer a new fusing surface.

9 Claims, 1 Drawing Sheet

METHOD TO RENEW A SPENT FUSER MEMBER

FIELD OF THE INVENTION

The present invention relates to a method for creating a new fusing surface on a spent fuser member in order to reuse the fuser member in electrostatographic printing apparatus.

BACKGROUND OF THE INVENTION

In a typical electrostatographic printing apparatus, a light image of an original to be copied is recorded in the form of an electrostatic latent image upon a photosensitive member and the latent image is subsequently rendered visible by the application of toner. The visible toner image is then in a loose powdered form and can be easily disturbed or destroyed. The toner image is usually fixed or fused upon a support which may be a photosensitive member itself or other support sheet such as plain paper.

The use of thermal energy for fixing toner images onto a support member is well known. In order to fuse toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, thermoplastic resin particles are fused to the substrate by heating to a temperature of between about 90° C. to about 160° C. or higher depending upon the softening range of the particular resin used in the toner. It is not desirable, however, to raise the temperature of the substrate substantially higher than about 200° C. because of the tendency of the substrate to discolor at such elevated temperatures particularly when the substrate is paper.

Several approaches to thermal fusing of toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and they can be adjusted to suit particular machines or process conditions.

After repeated fusing cycles, the fusing surface of the fusing member will eventually exhibit unsatisfactory toner release, leading to poor quality prints. Typically, the fuser member is then either tossed away or recycled by stripping off all the coatings and then recoating the substrate to produce a new fuser member. Thus, there is a need, which the present invention addresses, for a more economical method to renew a spent fuser member.

Fuser members and their fabrication methods are disclosed in Del Rosario, U.S. Pat. Nos. 5,035,950; Chow, 4,876,777; and Evans et al., 4,465,646.

The present inventors believe the fuser members described in Clifford O. Eddy et al. U.S. appln. Ser. No. 08/572,212 and Chen et al., U.S. Pat. No. 5,595,823 (assigned to Eastman Kodak Company), the disclosures of which are hereby totally incorporated by reference, may be renewed in embodiments of the present invention.

SUMMARY OF THE INVENTION

A method for reusing a fuser member comprised of an outer layer having an original fusing surface that is deficient comprising: removing a portion of the thickness of the outer layer including the original fusing surface to create on the remaining outer layer a new fusing surface.

BRIEF DESCRIPTION OF THE DRAWINGS

Other aspects of the present invention will become apparent as the following description proceeds and upon reference to the FIGURE which represents a preferred embodiment.

DETAILED DESCRIPTION

Figure 1:
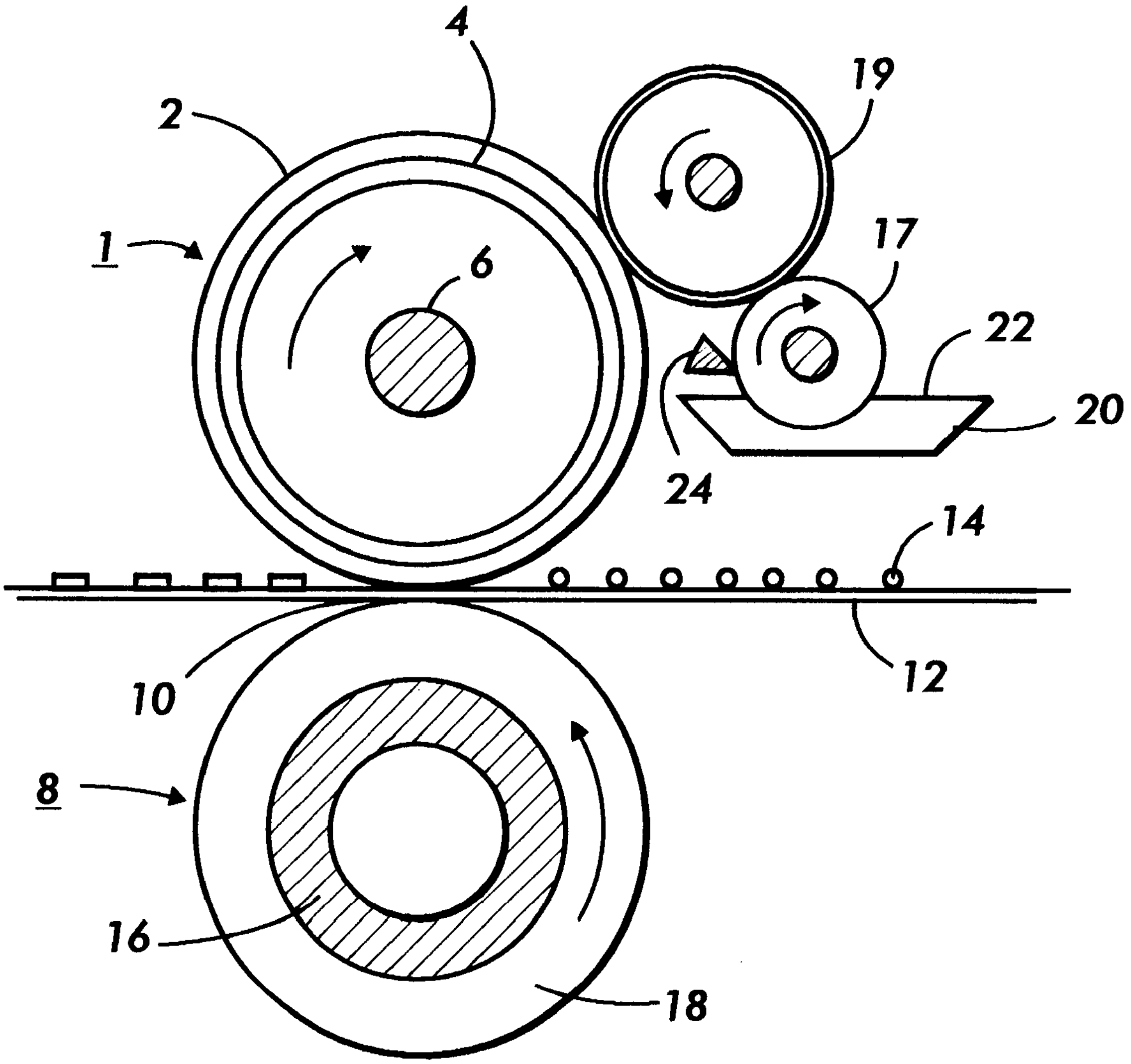
FIG. 1 is a sectional view of a fuser system which may use the fuser member having the new fusing surface.

The present inventors have recognized that certain spent fuser members can be renewed if they are otherwise usable except for the deficient original fusing surface. In embodiments of the present invention, the spent fuser members still retain: satisfactory mechanical integrity in terms of toughness, modulus, and hardness in each of the layers; bonding between adjacent layers; minimal or no chemical change in the layers except at the original fusing surface. The deficiency at the original fusing surface may be for example a surface profile defect such as a scratch or a gouge, or a chemical defect resulting from chemical reactions between the fusing surface and the toner or toner release agents rendering the fusing surface unsatisfactory for toner release.

The present method may be employed for any suitable fuser member configuration such as where the fuser member includes a substrate, an adhesive layer, and a single elastomeric coating in the specified order. In this configuration, the outer layer is the single elastomeric coating. In other embodiments, the fuser member includes in the specified order a substrate, an adhesive layer, a base coating layer, and a top coating layer. In this configuration, the outer layer is the top coating layer. The outer layer is also referred herein as the surface layer.

The present method removes a portion of the thickness of the outer layer including the original fusing surface ranging for example from about 5% to about 70%, preferably from about 10% to about 40%, of the thickness of the outer layer. The outer layer may have a thickness ranging for example from about 7 mils to about 15 mils, preferably from about 9 mils to about 12 mils prior to removing the portion of the outer layer. After the removal of the portion of the outer layer, the outer layer may have a thickness ranging from about 6 mils to about 14 mils, preferably from about 8 mils to about 11 mils.

The outer layer may be thicker than that conventionally used. Especially in the higher thickness range, one or more of the fuser member coatings such as the outer layer can be applied by crosshead extrusion or other processes that use no solvent at all and is thus an even more environmentally acceptable roll manufacturing process. These processes would be facilitated by the use of narrower molecular weight distribution, low Mooney viscosity fluoroelastomers such as DuPont's VTR 7244™.

The removal may be accomplished by any suitable technique including for example physical removal methods such as lathing with a diamond tool and abrasive machining which includes:

(1) grinding using stone, vitrified CBN (Cubic Boron Nitride) or metal wheels. The materials for the wheels can include: silicon carbide, aluminum oxide, CBN with grit sizes of 60–325 and various structures (open to dense) and bonding materials (vitrified, resinoid, and rubber). Special construction using sharp tungsten carbide tooth points bonded to steel wheel (commercial name RUBBER HOG™) can be used.

(2) sanding paper; and (3) superfinishing: an automated machine using moving abrasive paper with oscillation and pressure. The abrasives on the paper can include: silicon carbide, aluminum oxide, alumina-zirconia, diamond, ceramic aluminum oxide with particle sizes from 3 microns to 100 microns. Besides paper, the abrasives may be on cloth and polyester films. The removal processes described herein can be dry or with a coolant/lubricant fluid.

The removal process is preferably accomplished without changing the chemical structure of the outer layer such that the surface energy of the new fusing surface remains the same as the surface energy of the original fusing surface. In embodiments, the removal process may change the chemical structure of the outer layer such that the surface energy of the new fusing surface is lower than the surface energy of the original fusing surface. A cutting device employing a laser preferably should not be used since the laser may create a new fusing surface having an undesirably higher surface energy than the original fusing surface. In addition, chemical etching or electrochemical etching preferably should not be used because of the likelihood of creating a new fusing surface having a higher surface energy than the original fusing surface.

The removal process is preferably accomplished such that the mechanical characteristics of the remaining outer layer are similar to the mechanical characteristics of the outer layer having the deficient original fusing surface. For example, by trial and error, it can be determined for a particular fuser member how much of the outer layer can be removed without significantly affecting in a negative manner the mechanical characteristics; if too much is removed, the remaining outer layer may be for instance insufficiently conformable. The mechanical characteristics are hardness, modulus, and conformability. Conformability means how easily does the material deform under applied pressure especially around toner particles. An elastomeric material having an effective modulus above 3000 psi or a hardness above 90 Shore A generally will not give enough toner particle conformability and will yield a mottled appearing image in solid toner areas. The Shore A hardness may range for example from about 78 to about 89 and the modulus may range for instance from about 1200 psi to about 2000 psi. It is understood that the term "similar" encompasses those embodiments where the mechanical characteristics of the remaining outer layer are the same as or slightly different from those of the outer layer having the deficient original fusing surface. In fact, the mechanical characteristics of the remaining outer layer may be slightly inferior, but they still permit the fuser member to be reused in a satisfactory manner. The mechanical characteristics of the remaining outer layer may differ from the mechanical characteristics of the outer layer having the deficient original fusing surface by an amount ranging for example from 0% to about 20%, preferably from 0% to about 10%, for each characteristic.

The new fusing surface created by the present method may exhibit substantially the same toner release capability as a fresh or new fuser member. The new fusing surface has a toner release capability ranging for example from about 95% to 100%. What is meant by restoring the release capability of the fuser coating to 100% is the fact that after removing some of the coating from the failed fuser member, the release capability of the remaining material is then equivalent to that of a virgin fuser member coating. In addition, the remaining outer layer preferably has a thermal conductivity of at least about 0.24 watts/meter ° Kelvin.

While the following discussion of the alumina filler is primarily in terms of calcined alumina, all other types of alumina filler such as tabular alumina, fumed alumina, and fused alumina may be used in addition to or in place of the calcined alumina. As discussed in more detail herein, the alumina filler in the surface layer of the fuser member may be of only one type or a mixture of two or more alumina types selected from the group consisting of for example calcined alumina, tabular alumina, fumed alumina, and fused alumina. The alumina filler particles may be of either alpha or gamma crystalline type. Unless otherwise indicated, fused alumina, fumed alumina, tabular alumina, or a mixture of different types of alumina may be used in the same or similar amounts and particle sizes as calcined alumina, and provide the same or similar advantages as calcined alumina in the surface layer of the fuser member. The type of filler particles employed in the surface layer is not limited to alumina filler; other suitable filler particles can be used.

While the following discussion is primarily in terms of a hydrofluoroelastomer, other suitable fluoroelastomers such as FFKM elastomers may be used.

As used herein, the phrase average particle size as used in connection with the alumina filler refers to the median volume average which is a point on a histogram describing particle size volume distribution. It is the point on the scale of observations which has equal area under the histogram on either side.

The fuser member renewed by the present invention is described in conjunction with a fuser assembly as shown in FIG. 1 where the numeral 1 designates a fuser member which is in the configuration of a roll including outer layer 2 upon suitable base member 4 which is a hollow cylinder or core fabricated from any suitable metal such as aluminum, anodized aluminum, steel, nickel, copper, and the like, having a suitable heating element 6 disposed in the hollow portion thereof which is coextensive with the cylinder. Backup or pressure roll 8 cooperates with fuser roll 1 to form a nip or contact arc 10 through which a copy paper or other substrate 12 passes such that toner image 14 thereon contacts the surface of the outer layer 2 of fuser roll 1. As shown in FIG. 1, the backup roll 8 has a rigid hollow steel core 16 with a soft surface layer 18 thereon. Sump 20 contains polymeric release agent 22 which may be a solid or liquid at room temperature, but is a fluid at operating temperatures.

In the embodiment shown in FIG. 1 for applying the polymeric release agent 22 to outer layer 2, two release agent delivery rolls 17 and 19 rotatably mounted in the direction indicated are provided to transport release agent 22 from the sump 20 to the outer layer 2. As illustrated in FIG. 1, roll 17 is partly immersed in the sump 20 and transports on its surface release agent from the sump to the delivery roll 19. By using a metering blade 24 a layer of polymeric release fluid can be applied initially to the delivery roll 19 and subsequently to outer layer 2 in controlled thickness ranging from submicrometer thickness to thickness of several micrometers of release fluid. Thus, by metering device 24 about 0.1 to 2 micrometers or greater thickness of release fluid can be applied to the surface of elastomer surface layer 2.

The fuser member may be a roll, belt, flat surface or other suitable shape used in the fixing of thermoplastic toner images to a suitable substrate. Typically, the fuser member is made of a hollow cylindrical metal core, such as copper, aluminum, steel and like, and has an outer layer of the selected cured fluoroelastomer. Alternatively, there may be one or more thermally conductive intermediate layers between the substrate and the outer layer of the cured elastomer if desired. Typical materials having the appropriate thermal and mechanical properties for such intermediate layers include thermally conductive (e.g., 0.59 watts/meter ° Kelvin) silicone elastomers such as high temperature vulcanizable ("HTV") materials and liquid silicone rubbers ("LSR"), which may include an alumina filler in the amounts described herein. The silicone elastomer may have a thickness of about 2 mm (radius). An HTV is either a plain polydimethyl siloxane ("PDMS"), with only methyl substituents on the chain, $(OSi(CH_3)_2)$ or a similar material with some vinyl groups on the chain $(OSi(CH{=}CH_2)(CH_3))$. Either material is peroxide cured to create crosslinking. An LSR usually consists of two types of PDMS chains, one with some vinyl substituents and the other with some hydride substituents. They are kept separate until they are mixed just prior to molding. A catalyst in one of the components leads to the addition of the hydride group $(OSiH(CH_3))$ in one type of chain to the vinyl group in the other type of chain causing crosslinking.

In accordance with the present invention a fusing system including a fusing member is provided wherein the surface layer of the fusing member preferably includes an fluoroelastomer filled with an alumina filler having an average particle size of from about 0.5 to about 15 micrometers present in an amount to provide a thermal conductivity of at least 0.24 watts/meter ° Kelvin in the surface layer together with a hardness of from about 75 to about 90 and preferably about 82 Shore A. Typically the surface layer of the fuser member is from about 4 to about 9 mils and preferably 6 mils in thickness as a balance between conformability and cost and to provide thickness manufacturing latitude. Such a fusing system and fuser member have been found to provide sufficient hardness to the fuser member to enable penetration of the magnetic particles in the toner into the paper substrate such as check material while at the same time providing sufficient conformability of the thermoplastic resin to enable flow of the toner material around the individual magnetic particles. The hardness of the surface layer of the fuser member is greatly increased by increasing amounts of the alumina filler which enables embedding the toner as much as possible into the paper substrate. Furthermore, the harder the coating surface of the fuser member the greater the penetration of the toner into the paper.

Suitable fluoroelastomers include FFKM elastomers and hydrofluoroelastomers. Illustrative FFKM elastomers are perfluororubbers of the polymethylene type having all substituent groups on the polymer chain either fluoro, perfluoroalkyl, or perfluoroalkoxy groups. The hydrofluoroelastomers (also known as FKM elastomers), according to the present invention, are those defined in ASTM designation D1418-90 and are directed to fluororubbers of the polymethylene type having substituent fluoro and perfluoroalkyl or perfluoroalkoxy groups on a polymer chain.

The fluoroelastomers useful in the practice of the present invention are those described in detail in U.S. Pat. No. 4,257,699 to Lentz, as well as those described in commonly assigned U.S. Pat. Nos. 5,017,432 to Eddy et al. and 5,061,965 to Ferguson et al. As described therein, these fluoroelastomers, particularly from the class of copolymers, terpolymers, and tetrapolymers of vinylidenefluoride hexafluoropropylene, tetrafluoroethylene, and cure site monomer (believed to contain bromine) known commercially under various designations as VITON A™, VITON E60C™, VITON E430™, VITON 910™, VITON GH™, VITON GF™ and VITON F601C™. The VITON™ designation is a Trademark of E.I. DuPont deNemours, Inc. Other commercially available materials include FLUOREL 2170™, FLUOREL 2174™, FLUOREL 2176™, FLUOREL 2177™ and FLUOREL LVS 76™, FLUOREL™ being a Trademark of 3M Company. Additional commercially available materials include AFLAS™ a poly(propylene-tetrafluoroethylene) copolymer, FLUOREL II™ a poly(propylene-tetrafluoroethyelene-vinylidenefluoride) terpolymer both also available from 3M Company. Also, the TECNOFLONS™ identified as FOR-60KIR, FOR-LHF, NM, FOR-THF, FOR-TFS, TH, TN505 are available from Ausimont Chemical Co. Typically, these fluoroelastomers can be cured with a nucleophilic addition curing system, such as a bisphenol crosslinking agent with an organophosphonium salt accelerator as described in further detail in the above referenced Lentz Patent, and in the Eddy et al. patent or with a peroxide as described in DuPont's literature in which case a cure site monomer such as bromomethyl perfluorovinyl ether is also necessary.

A particularly preferred embodiment of the hydrofluoroelastomer is that described in U.S. Pat. No. 5,017,432 to Eddy et al. which provides a fuser member surface layer comprising poly(vinylidenefluoride-hexafluoropropylene-tetrafluoroethylene-cure site monomer believed to contain bromine) wherein the vinylidenefluoride is present in an amount less than 40 weight percent and which is cured from a dried solvent solution thereof with a nucleophilic curing agent soluble in the solvent solution and in the presence of less than 4 parts by weight inorganic base per 100 parts of polymer, the inorganic base being effective to at least partially dehydrofluorinate the vinylidenefluoride, which is described in greater detail in U.S. Pat. No. 5,017,432 and the nucleophilic curing system is further described in greater detail in U.S. Pat. No. 4,272,179 to Seanor and U.S. Pat. No. 4,264,181 to Lentz et al.

The fluoroelastomer may be filled with alumina such as calcined alumina to provide the desired hardness, thermal conductivity and conformability of the surface of the fuser member. Calcined alumina is alumina heated to a temperature below 3700° F. which prevents fusion from taking place but still allows water to be driven off. This produces a highly surface active filler which in combination with an average particle size of from about 0.5 to 15 micrometers and preferably 1 to 9 micrometers, provides the desired thermal conductivity, hardness and conformability of the outer layer. While the 1 micrometer and 9 micrometer sizes provide approximately the same results in filler performance, in order to provide a more processable material and minimize problems with filler size, it is preferred to use a filler having a nominal size of about 1 micrometer. The thermal conductivity of the surface layer is at least about 0.24 watts/meter ° Kelvin to provide an acceptable fix with good adhesion of the toner to the substrate which may be achieved at about 11 volume % of calcined alumina in the total volume of the surface layer. This corresponds to about 30 parts by weight of calcined alumina per 100 parts by weight of fluoroelastomer. In a particularly preferred embodiment achieving a good balance between good adhesion and conformability on the one hand and hardness on the other hand the surface layer has about 20% by volume of the total volume of calcined alumina or 55 parts by weight of calcined alumina per 100 parts by weight fluoroelastomer providing a thermal conductivity of about 0.31 watts/meter ° Kelvin. Generally the calcined alumina filler may be present in the FKM surface layer in an amount of from about 30 parts by weight to about 100 parts and preferably from about 40 to about 70 parts by weight per 100 parts by weight of the fluoroelastomer. A particularly preferred amount of calcined alumina in providing the best balance between thermal conductivity and hardness is about 55 parts by weight per 100 parts by weight of the fluoroelastomer. Such formulations with only the calcined alumina present to provide the thermal conductivity and no additional filler are typically employed in fusing systems with toner release agents which do not require the use of anchoring sites of metal oxide particles. Such toner release agents include the aminofunctional release agents described in U.S. application Ser. No. 08/314,759 filed Sep. 29, 1994.

An option according to the present invention and a further preferred embodiment includes the use of metal oxide filler particles as anchoring sites for a functional toner release agent. The preferred embodiment includes up to about 30 parts by weight, preferably about 12 to 18 parts and most preferably 15 parts by weight of copper oxide (cupric oxide) in the surface layer per 100 parts by weight of the fluoroelastomer which is useful in a fusing system in conjunction with a functional release agent and in particular a mercapto functional oil as described in U.S. Pat. No. 4,029,827 to Imperial et al. In this embodiment the cupric oxide particles providing the anchoring sites for the functional release agent are provided in the total filler constituents of the surface layer in about a volume for volume substitution of the cupric oxide for the alumina. It is important that in all embodiments the amount of total filler including alumina and any cupric oxide as well as additional filler material not be present in such a large amount as to make the surface layer so hard that acceptable conformity of the toner around the magnetic particles is not achieved.

The particle size described herein for the alumina filler is an important factor contributing to improved release of the toner from the fuser member, thereby minimizing or eliminating the hot offset phenomenon wherein toner adheres to the surface of the fuser member and such residual toner subsequently being transferred to a copy sheet. The alumina filler in the surface layer of the fuser member may be of only one type of alumina or a mixture of two or more types of alumina selected for example from calcined alumina, fumed alumina, fused alumina, and tabular alumina. Any suitable mixture ratio can be used such as from about 95% to 5% of one alumina type and from about 5% to about 95% for the second alumina type for a two component mixture. The various alumina types can be used individually or in any combination, where illustrative mixtures include calcined alumina/tabular alumina; tabular alumina/fused alumina; fumed alumina/calcined alumina; and calcined alumina/tabular alumina/fused alumina. Mixtures of different alumina types, fused alumina alone, fumed alumina alone, or tabular alumina alone all may be as effective as the use of only calcined alumina in the present fuser member because the various types of alumina all have the same or similar thermal conductivity value of 25 watts/meter ° Kelvin. Anhydrous alumina is preferred. Fused alumina is prepared by heating alumina to about 4172° F. (above its melting point of 3761° F. ), cooling, and then grinding the alumina to the desired particle size. Fumed alumina is made by the high temperature oxidation of aluminum chloride which results in submicron particles of aluminum oxide. The calcined alumina according to the present invention is to be distinguished from tabular alumina, which is a sintered alumina that has been heated to a temperature slightly below 3700° F., the fusion point of aluminum oxide. The name "tabular" comes from the fact that the material is composed predominantly of table-like crystals. Tabular alumina having an average particle size of about 5 to 7 microns is available from Alcoa (designation of 20 micron alumina).

Other adjuvents and fillers may be incorporated in the elastomer in accordance with the present invention as long as they do not affect the integrity of the elastomer, the interaction between the metal oxide and the polymeric release agent or prevent the appropriate crosslinking of the elastomer. Such fillers normally encountered in the compounding of elastomers include coloring agents, reinforcing fillers, crosslinking agents, processing aids, accelerators and polymerization initiators.

The nucleophilic curing system with the bisphenol crosslinking agent and organophosphonium salt accelerator is described in U.S. Pat. No. 4,272,179. However, the nucleophilic curing agent (crosslinking agent and accelerator) is soluble or suspendable in a solvent solution of the polymer (for example VITON GF) and is used in the presence of less than 4 parts by weight of inorganic base (e.g., $Ca(OH)_2$ and MgO) per 100 parts by weight of polymer. Normally, the tetrapolymers of vinylidenefluoride hexafluoropropylene and tetrafluoroethylene are peroxide cured. However, as previously discussed the preferred fabricating procedure for a fuser member is to spray a solvent solution of the polymer onto a substrate thereby rendering peroxide curing in air difficult since the peroxide preferentially reacts with oxygen in the air or residual solvent rather than curing the polymer. The preferred alternative curing system is a nucleophilic curing system such as a bisphenol crosslinking agent and an organophosphonium salt accelerator. Typically, the curing process takes place in the presence of 8 to 10 parts by weight of inorganic base per 100 parts of polymer. The inorganic base dehydrofluorinates the vinylidenefluoride in the polymer creating double bonds which act as reactive sites for crosslinking. However, the presence of excess base results in the long term degradation of the elastomers and if excess base continues to dehydrofluorinate the vinylidenefluoride generating double bonds which cause the fuser member to harden, subsequent oxidation causes the surface energy to increase and the release performance to degrade. Thus, it is preferred to cure the polymer at a relatively low base level to control the reactivity of the vinylidene fluoride. The typical curing agents such as VITON Curative No. 30™ which is about 50 percent by weight bisphenol AF and 50 percent by weight poly(vinylidenefluoride-hexafluoropropylene) and VITON Curative No. 20™ which is about one third triphenyl benzyl phosphonium chloride and two thirds poly(vinylidenefluoride-hexafluoropropylene) both available from E.I. DuPont deNemours Company will not function as curing agents at low base levels. While the exact reason for this is not clear, it is believed to be at least in part due to the fact that Curative No. 20 is not soluble in the solvent solution of the polymer and therefore is not in close proximity to many of the smaller number of reactive sites for crosslinking performed by the dehydrofluorination of the vinylidenefluoride. While Curative Nos. 20 and 30 do not function effectively at low base levels, another VITON™ Curative, Curative No. 50 also available from E. I. DuPont deNemours which is normally used with high base levels can be used to cure poly(vinylidenefluoride-hexafluoropropylene-tetrafluoroethylene) at less than one half its normal base level or less than about 4 parts by weight per 100 parts of polymer. Since the Curative No. 50 is soluble in the solvent solution of the polymer at low base levels it is readily available at the reactive sites for crosslinking. The VITON Curative No. 50 ™ incorporates an accelerator (a quarternary phosphonium salt or salts) and a crosslinking agent, bisphenol AF into a single curative system.

The fuser member of the present invention is preferably a roll, preferably one prepared by applying either in one application or successively applying to the surface to be coated thereon, a thin coating or coatings of the elastomer with alumina filler dispersed therein. Coating is most conveniently carried out by spraying, dipping, or the like a solution or homogeneous suspension of the elastomer containing the filler. While molding, extruding and wrapping techniques are alternative means which may be used, we prefer to spray successive applications of a solvent solution of the polymer, alumina and other metal oxide filler, if any, to the surface to be coated. Typical solvents that may be used for this purpose include methyl ethyl ketone, methyl isobutyl ketone and the like. When successive applications are made to the surface to be coated it is generally necessary to heat the film coated surface to a temperature sufficient to flash off any solvent contained in the film. For example, when a fuser roll is coated with an elastomer layer containing metal oxide, the elastomer having metal oxide dispersed therein is successively applied to the roll in thin coatings and between each application evaporation of the solvent in the film coated on the roll is carried out at temperatures of at least 25° C. to about 90° C. or higher so as to flash off most of the solvent contained in the film. When the desired thickness of coating is obtained, the coating is cured and thereby bonded to the roll surface. Typically, the coating is cured by a stepwise heating process of about 24 hours such as 2 hours at 95° C., 2 hours at 150° C., 2 hours at 175° C., 2 hours at 200° C. and 16 hours at 230° C., followed by cooling and sanding.

A typical formulation for the surface layer of the fuser member includes:

100 parts by weight of the hydrofluoroelastomer available from E.I. DuPont or 3M 30 to 75 parts by weight of the calcined alumina available from K. C. Abrasives 1 part by weight of $Ca(OH)_2$ available from J. T. Baker 2 parts by weight MgO, Maglite D available from C. P. Hall 2 parts by weight carbon black N990 available from R. T. Vanderbilt Co.

5 parts by weight of DuPont VC50 available from E. I. DuPont

Optionally up to 30 parts by weight cupric oxide available from American Chemet as product number 13600 may be included.

The thermally conductive hard surface layer of the fuser member containing the fluoroelastomer together with the alumina filler may be present in a thickness for example of from about 4 to about 9 mils and preferably about 6 mils which provide a suitable balance between conductivity and conformability. Below about 4 mils the conformability of the surface layer decreases to a point where it shows no more conformability than the metal core while above about 6 mils the issue is not one of performance, but rather one of relative cost of the materials in the layer.

The fuser member according to the present invention, which in a specific embodiment is an internally heated fuser roll, may be used in a fusing system with or without a functional oil as a toner release agent. In the event that a mercapto functional oil is desired to be used the fusing surface should contain appropriate anchor sites such as metal oxide particles. In this regard, attention is directed to the above referenced Lentz et al., Lentz and Seanor patents, which describe fuser members and methods of fusing thermoplastic resin toner images to a substrate wherein the polymeric release agent having functional groups is applied to the surface of the fuser member. In a preferred embodiment of the present invention a mercapto functional oil may be used as a release agent in conjunction with cupric oxide anchoring sites in the fusing surface. On the other hand, and in another preferred embodiment of the present invention, an aminofunctional toner release agent is used, which, because it has functional amino groups which react with the fluoroelastomer surface, may be used without anchoring sites such as metal oxide particles like cupric oxide in the surface of the fuser member. Such aminofunctional release agents include those described in U.S. Ser. No. 08/314,759 filed Sep. 29, 1994, the disclosure of which is totally incorporated by reference. Preferred amino functional release agents are also disclosed in Shoji et al., U.S. Pat. No. 5,157,445, the disclosure of which is totally incorporated by reference. Preferred mercapto functional silicone release agents are disclosed in Imperial et al., U.S. Pat No. 4,029,827, the disclosure of which is totally incorporated by reference.

To promote adhesion between the fuser member core and the hydrofluoroelastomer surface layer, an adhesive, and in particular a silane adhesive, such as described in U.S. Pat. No. 5,049,444 to Bingham et al. entitled "Silane Adhesive System For Fusing Member" which includes a copolymer of vinylidenefluoride, hexafluoropropylene and at least 20 percent by weight of a coupling agent which comprises at least one organo functional silane and an activator may be used. In addition, for the higher molecular weight hydrofluoroelastomers such as, for example, VITON GF, the adhesive may be formed from the FKM hydrofluoroelastomer in a solvent solution together with an amino silane represented by the formula as described in U.S. Pat. No. 5,332,641:

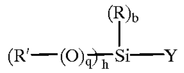

where R can be an alkyl group having 1 to 7 carbon atoms; R' can be an alkyl group having 1 to 7 carbon atoms or a polyalkoxyalkyl group of less than 7 carbon atoms; Y is an amino group or an amino substituted alkyl, or a polyamino substituted alkyl, or an alkenylalkoxy amino, or an aryl amino group of less than 15 carbon atoms, h is 1 to 3, b 0 to 2, q is 1 or 2 and h+b equals 3.

Other modifications of the present invention may occur to those skilled in the art based upon a reading of the present disclosure and these modifications are intended to be included within the scope of the present invention.

What is claimed is:

1. A method for reusing a fuser member comprised of an outer layer having an original fusing surface that is deficient comprising removing a portion of the thickness of the outer layer including the original fusing surface to create on the remaining outer layer a new fusing surface wherein there is absent recoating of the remaining outer layer with outer layer material.

2. The method of claim 1, wherein the outer layer has a thickness ranging from about 7 mils to about 15 mils prior to removing the portion of the thickness of the outer layer.

3. The method of claim 1, wherein the removed portion of the thickness of the outer layer ranges from about 5% to about 70% of the thickness of the outer layer.

4. The method of claim 1, wherein the new fusing surface exhibits substantially the same toner release capability as a fresh fuser member.

5. The method of claim 1, wherein the removal of the portion of the outer layer is accomplished by lathing.

6. The method of claim 1, wherein the removal of the portion of the outer layer is accomplished without changing the chemical structure of the outer layer.

7. The method of claim 1, wherein the remaining outer layer includes a fluoroelastomer and filler particles which act as anchoring sites for a toner release agent.

8. The method of claim 1, wherein the removal of the portion of the outer layer is accomplished such that the mechanical characteristics of the remaining outer layer are similar to the mechanical characteristics of the outer layer having the original fusing surface exhibiting unsatisfactory toner release.

9. The method of claim 1, wherein the fuser member has the configuration of a roll.

* * * * *